UNITED STATES PATENT OFFICE.

ALBRECHT SCHMIDT AND KARL THIESS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

REDDISH-BLUE VAT DYESTUFFS AND PROCESS OF MAKING SAME.

1,028,911. Specification of Letters Patent. Patented June 11, 1912.

No Drawing. Application filed October 20, 1910. Serial No. 588,148.

*To all whom it may concern:*

Be it known that we, ALBRECHT SCHMIDT, Ph. D., chemist, and KARL THIESS, Ph. D., chemist, citizens of the Empire of Germany, residing at Höchst-on-the-Main, Germany, have invented certain new and useful Improvements in Reddish-Blue Vat Dyestuffs and Processes of Making Same, of which the following is a specification.

We have found that by treating the product obtained by condensing 7-methylindoxyl and isatin, with a halogen, particularly with bromin, vat dyestuffs are obtained which are remarkable for their reddish-blue tint and their excellent fastness. These products have the structural formula:

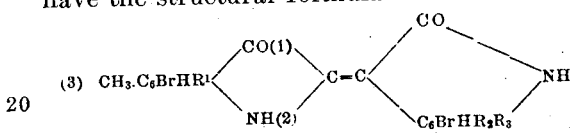

wherein $R^1$, $R^2$, $R^3$ stand for the radicals hydrogen and bromin. This is in many respects an unexpected and surprising result. In the first place the new dyestuffs are of quite another technical utility than that of the dyestuffs described in German specification No. 192682. The latter, which are produced by brominating indirubin, are bluish-red, whereas the dyestuffs of the present invention show an entirely different tint, dyeing violet-blue shades. It could not be foreseen that by introducing a methyl group and brominating, the tints would be altered in such an extraordinary manner, because, for instance, the condensation-product obtained from dibromisatin with 7-methylindoxyl dyes the same bluish-red tints as the condensation product obtained from dibromisatin and indoxyl; it follows from this that the methyl group has no particular influence in this case. In like manner, for instance, the brominated condensation product obtained from 7-methylisatin and indoxyl dyes bluish-red tints as compared with the pronounced violet-blues obtainable according to our present invention. Furthermore, the dyestuffs of our present invention have, apart from their different tint, the advantage over those described in the said German patent that their fastness is considerably greater when brominated to the same degree, which is of great importance, especially in wool-dyeing, in view of the fact that they are more readily soluble to a vat and require a smaller proportion of alkali. The dyeings obtainable by the dyestuffs of the present invention have moreover the valuable property of altering their tint but little or not at all when treated with boiling water or soaped at the boiling temperature. The result obtained by the new process is also surprising inasmuch as it could not be expected that by brominating such an indigoid dyestuff containing a methyl group, new and valuable results could be obtained, since this is not the case with another indigoid dyestuff containing a methyl group, namely dimethylindigo ($CH_3$ in ortho position to the nitrogen). This is confirmed for instance by the fact that no brominated dimethylindigo is on the market.

For producing the new dyestuffs, the various brominating or halogenating processes at present known in the manufacture of halogenindigo may be used; products of different composition and more or less different tinctorial properties are obtained accordingly as one or other method is employed. Thus the bromination may be effected for instance, in presence of nitrobenzene, or carbon bisulfid, or the like. Furthermore, there can be produced, by means of liquid bromin, bromin-substituted perbromids which are converted into the brominated dyestuffs by the action of agents capable of eliminating bromin, such for instance, as bisulfite. There may also be used the method of brominating with the aid of a sulfur acid, this term including a concentrated sulfuric acid as well as the chlorosulfonic acid. Thus by these methods products are obtained which vary with regard to the proportion of bromin they contain, from mono- to penta-substituted derivatives, according to the working conditions and to the proportion of bromin used.

The following examples illustrate our invention, the parts being by weight.

(1.) 26.2 parts of the product obtained by condensing isatin and 7-methylindoxyl in neutral or slightly alkaline aqueous suspension, or in an organic solvent, are introduced while stirring into 262 parts of nitrobenzene and 38 parts of bromin are then added while cooling; this mixture is stirred for several hours at ordinary temperature and finally heated for three hours to 120–130° C. (temperature of the oil bath).

After cooling, the mass is diluted with alcohol, filtered and washed. The dyestuff, obtained in the form of a bluish-violet crystalline powder, is insoluble in water, very difficultly soluble in alcohol, difficultly soluble in chloroform to a violet solution, pretty readily soluble in alinin or nitrobenzene to a violet solution, difficultly soluble in concentrated sulfuric acid to a dark green solution, and readily soluble in chlorosulfonic acid to a solution which is first reddish-violet and afterward dark green. The dyestuff contains 40.78 per cent. of bromin and yields, when reduced with hydrosulfite and alkali, a yellowish vat which dyes wool and cotton reddish-blue tints of great fastness. By using a smaller proportion of bromin, products which are less brominated are obtained.

(2.) 26.2 parts of the product obtained by condensing isatin and 7-methylindoxyl are introduced into 180 parts of bromin while cooling. The mixture is stirred for several hours at ordinary temperature and finally heated for three hours to 50–60° C. The mass is diluted with carbon tetrachlorid, filtered and washed, and the blackish product of the reaction is heated with a solution of sodium bisulfite or extracted with boiling alcohol. The coloring matter thus obtained is a penta-substituted tetrabromo dyestuff and dyes tints of a more intense blue than that produced by the dyestuff obtained according to Example 1. By causing the bromin to act for a longer time, or by applying slight pressure, a hexa-substituted penta-bromo dyestuff is obtained.

(3.) 26.2 parts of the said condensation product are introduced into a mixture of 262 parts of concentrated sulfuric acid and 34 parts of bromin while cooling. The mixture is stirred for several hours at ordinary temperature and heated for 2–3 hours to 40–50° C. The mass is poured on sodium bisulfite solution to which ice is added; the separated dyestuff is filtered, washed with hot water until it becomes neutral and dried. It dyes tints of a more intense blue than that obtained with the dyestuff made according to Example 1 and contains about 43 per cent. of bromin.

(4.) 26.2 parts of the said condensation product are introduced into a solution of 40 parts of bromin in 180 parts of chlorsulfonic acid while well cooling. The stirring is continued for an hour while further cooling and for another hour at ordinary temperature. The mass is poured on a solution of sodium bisulfite to which ice is added, filtered, washed until it becomes neutral and extracted with a solution of sodium carbonate or boiling alcohol. The dyestuff thus obtained is a tri-bromo-derivative and resembles very much those obtained according to Examples 1–3. When using more than 40 parts of bromin, tetra- or pentabromo dyestuffs are obtained, according to the proportion of bromin used.

The chlorination can be effected in like manner to the bromination, but in this case considerably lower temperatures must be applied. Thus, for instance, a chlorination-product is obtained by means of chlorin or of sulfuryl chlorid in presence of nitrobenzene.

Having now described our invention, what we claim is:

1. As new products, the herein-described dyestuffs obtainable by brominating the product obtained by condensing 7-methylindoxyl and isatin, the brominated product containing in a molecule from two to five atoms of bromin, being bluish-violet powders insoluble in water, very difficultly soluble in alcohol, difficultly soluble in chloroform to a violet solution, more readily soluble in anilin and nitrobenzene, difficultly soluble in concentrated sulfuric acid to a dark green solution, yielding when reduced with hydrosulfite and alkali a yellowish vat by which cotton and wool are dyed reddish-blue tints.

2. As a new product, the herein described vat dyestuff, having the formula

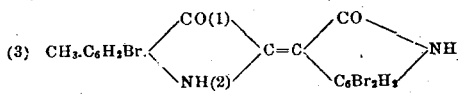

obtainable by brominating the product obtained by condensing 7-methylindoxyl and isatin, being a bluish-violet powder, insoluble in water, very difficultly soluble in alcohol, difficultly soluble in chloroform to a violet solution, more readily soluble in anilin and nitrobenzene, soluble in concentrated sulfuric acid to a dark-green solution, yielding when reduced with hydrosulfite in caustic soda lye a yellowish vat, by which cotton and wool are dyed reddish-blue tints.

3. The herein described process of manufacturing reddish-blue vat dyestuffs, which consists in treating with bromin the product obtained by condensing 7-methylindoxyl and isatin.

4. The herein described process of manufacturing reddish-blue vat-dyestuffs, which consists in treating with bromin, in presence of a sulfur acid, the product obtained by condensing 7-methylindoxyl and isatin.

In testimony whereof, we affix our signatures in presence of two witnesses.

ALBRECHT SCHMIDT.
KARL THIESS.

Witnesses:
JEAN GRUND,
CARL GRUND.